United States Patent
Webb et al.

(10) Patent No.: US 6,240,551 B1
(45) Date of Patent: May 29, 2001

(54) SATELLITE BROADCAST VIDEO PICTURE IMPROVING APPARATUS AND METHOD

(75) Inventors: Robert I. Webb, Lebanon, NJ (US); David Bergeron, Londonderry, NH (US); Christopher J. Daly, San Diego, CA (US)

(73) Assignee: NuWave Technologies, Inc., Fairfield, NJ (US)

( * ) Notice: Subject to any disclaimer, the term of this patent is extended or adjusted under 35 U.S.C. 154(b) by 0 days.

(21) Appl. No.: 09/040,233

(22) Filed: Mar. 14, 1998

(51) Int. Cl.[7] ............................................. H04N 7/16
(52) U.S. Cl. ......................... 725/68; 725/152; 725/140
(58) Field of Search ............................. 455/3.2, 6.2, 6.3; 348/10, 11, 6, 7, 12, 13, 460, 461, 473, 474, 673, 687, 693, 625, 627, 628, 607; 725/131, 132, 139, 140, 141, 151, 152, 63, 68

(56) References Cited

U.S. PATENT DOCUMENTS

| 4,800,426 | * | 1/1989 | Glenn | 358/141 |
|---|---|---|---|---|
| 5,299,004 | * | 3/1994 | Joo et al. | 348/614 |
| 5,654,774 | * | 8/1997 | Pugel et al. | 348/725 |
| 5,828,422 | * | 10/1998 | Gaudreau | 348/614 |
| 5,969,715 | * | 10/1999 | Dougherty et al. | 345/327 |

* cited by examiner

*Primary Examiner*—Chris Grant
(74) *Attorney, Agent, or Firm*—Steven J. Adamson

(57) ABSTRACT

An apparatus, method and system for transmitting a video signal and picture correction information therefor via a satelite or like transmission system. Mechanisms for, receiving a transmitted video signal and correction information and for processing a received video signal based on the correction information before display are also disclosed.

20 Claims, 2 Drawing Sheets

SATELLITE BROADCAST VIDEO PICTURE IMPROVING APPARATUS AND METHOD

FIELD OF THE INVENTION

The present invention relates to satellite television broadcast systems and, more specifically, to improving the picture provided by such systems.

BACKGROUND OF THE INVENTION

Recently, there has been growth in the field of satellite broadcast television systems. These systems usually have many channels, some over one hundred, and typically employ an on-screen menu for program selection.

Due in part to the large number of channels, a wide range of programs are available. There are channels that carry exclusively sports, old movies, shopping, etc. There are channels that show a variety of programs including old sit-coms, new movies, talk shows, major sports, entertainment and political events, etc. There is also outdoor programming, as well as general information and advertising, amongst others, as is known. It should be recognized that the optimum picture parameter settings for these different types of programming may vary. To some extent, the contrast, brightness and color buttons on a television monitor assist a viewer in compensating for these variances. For example, an old black and white sit-com may have different optimum picture parameter settings than a day-time football game, etc.

The quality of the picture projected on a television monitor or projection screen also depends on the quality of the original program, the manner in which the program was recorded and stored and the transmission media used for distribution, for example, there are inherent losses in clarity and other picture parameters during transmission.

A need exists for improving or otherwise affecting the picture of a program transmitted via a satellite broadcast or like transmission system to accommodate for both varying different optimum picture parameter settings and losses during transmission, amongst other consideration.

In addition, the human eye is capable of detecting a dynamic range of picture parameters beyond that which is currently broadcast. A need also exists for expanding the dynamic range of picture parameters provided to the end user.

SUMMARY OF THE INVENTION

Accordingly, it is an object of the present invention to provide an improved picture to users of satellite broadcast systems.

It is also an object of the present invention to permit a satellite broadcaster or an end user to select desired picture parameter settings.

It is another object of the present invention to increase the dynamic range of picture parameters provided with a satellite broadcast system.

These and related objects of the present invention are achieved by use of a satellite broadcast video picture improving apparatus and method as described herein.

The attainment of the foregoing and related advantages and features of the invention should be more readily apparent to those skilled in the art, after review of the following more detailed description of the invention taken together with the drawings.

DETAILED DESCRIPTION

Figure 1:
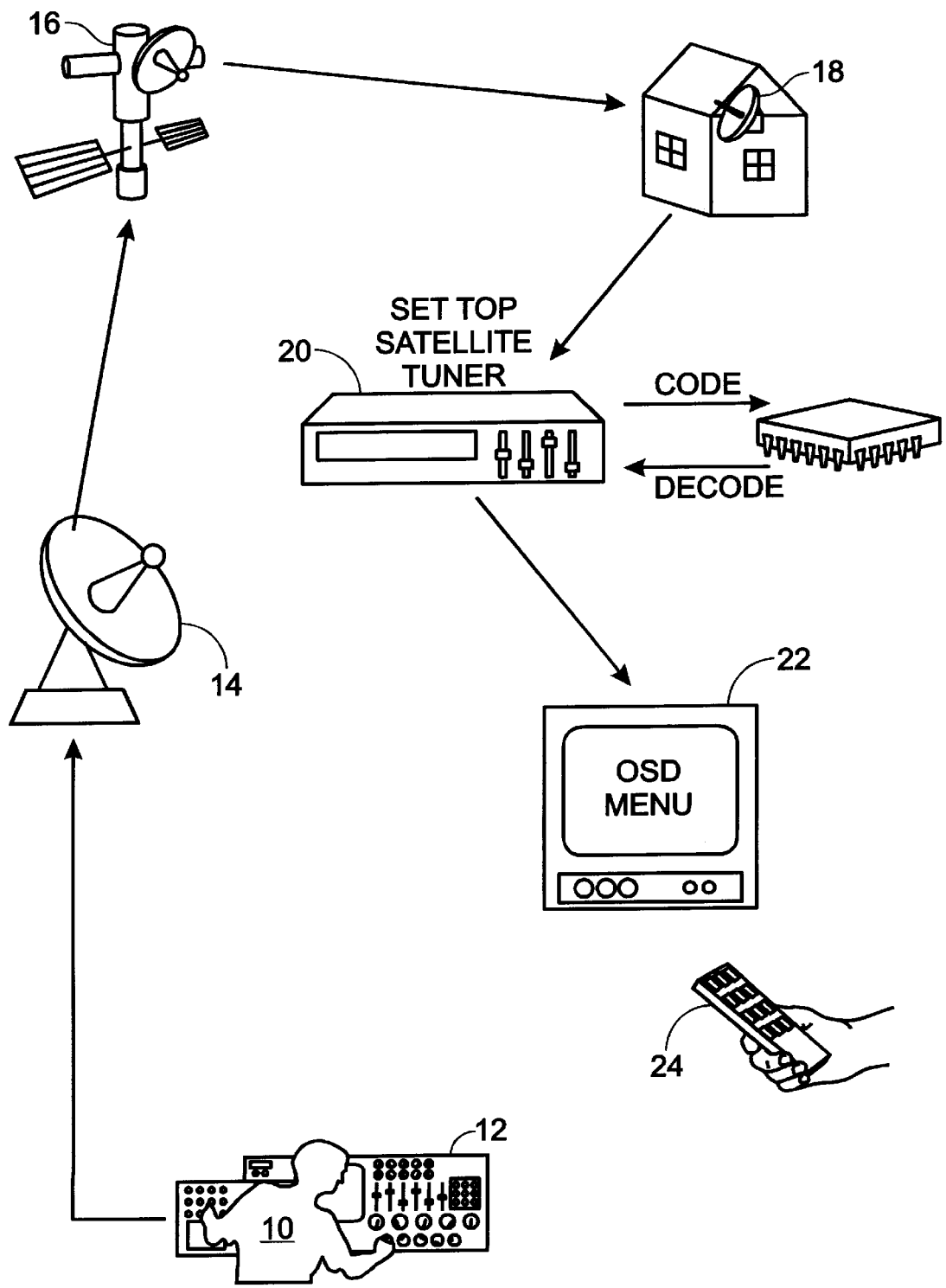
FIG. 1 is a diagram of a satellite television broadcast system in accordance with the present invention.

Referring to FIG. 1, a diagram of a satellite television broadcast system 5 in accordance with the present invention is shown. A colorist or other suitable person 10 previews a program before transmission and determines which picture parameter settings or, more specifically, which correction values provide a desired picture presentation. In a manner discussed in more detail below, the colorist or operator makes a selection that results in the designation of a particular "code" that represents a selected combination of picture parameter correction values.

The programs which are to be broadcast by the satellite system provider are propagated to satellite broadcast antenna 14 from which they are transmitted, each preferably at a different frequency as is known. A separate menu channel is also transmitted and a code that represents the selected combination of picture parameter correction values (for each program so enabled) is preferably transmitted via the menu channel signal.

Antenna 14 transmits the programs and menu channel data to a satellite 16 from which they are redirected to a user's receiving antenna 18. The receiving antenna is preferably connected to a set-top box (STB) that preferably includes a tuner (as is known) and that controls the programming displayed on monitor 22. The set-top box is in turn often controlled by a user directed remote control device 24 or by user selected external controls.

The present invention includes the placement in a STB or a receiving monitor (or in or in communication with other receive side components) of circuitry responsive to a transmitted code for improving or otherwise affecting the picture generated from the transmitted video signal based on that code. In the text that follows the correction circuitry is described as being within a STB. While this is done because placement in a STB is an envisioned commercial product, it should be recognized that the correction circuitry can be placed elsewhere in the signal path as alluded to in the beginning of this paragraph. In the text that follows, the circuitry for correcting the video signal is described first followed by a description of code formation.

Figure 2:
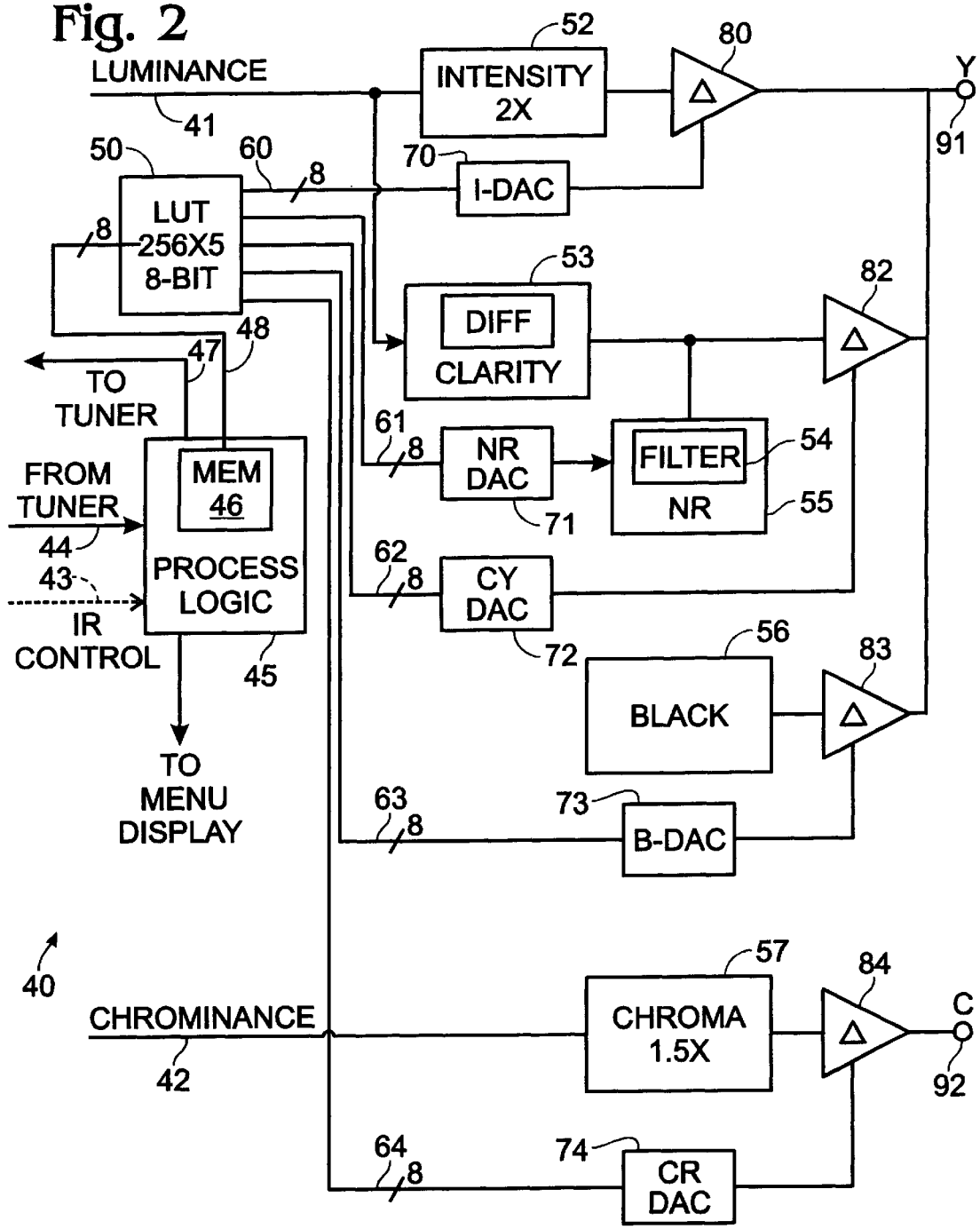
FIG. 2 is a diagram of correction circuitry in accordance with the present invention.

Referring to FIG. 2, a diagram of correction circuitry 40 in accordance with the present invention is shown. A common format for video signal processing includes separation of the luminance and the chrominance components of a video signal. Since standard circuitry for video signal and, more specifically, luminance and chrominance signal propagation is known in the art, this standard circuitry is not shown or discussed herein. It would be apparent, however, to one skilled in the art that on the received video processing side the luminance and chrominance signals may be separated. The circuitry of FIG. 2 is to be inserted in video processing logic in the separated luminance and chrominance signal paths as shown.

Circuit 40 includes processing logic 45, a look-up table (LUT) 50 and a plurality of picture parameter correction circuits, amongst other components. As discussed in more detail with reference to FIG. 3, the code or codes for a particular program in addition to time and program name information is preferably transmitted in the menu channel. Data in the menu channel is preferably in a serial format and streams into processing logic 45 over line 44 (when the tuner is tuned to the menu channel) from where the data is written to appropriate locations in memory 46. IR control over link 43 permits a user to select which portion of the menu data appears on monitor 22. In response to a user's selection, processing logic 45 outputs from memory the requested portion of the menu in a known manner. It should be recognized that there are often over one hundred channels and program information for all of these channels cannot be viewed on a monitor at the same time.

In conventional systems, a user typically selects a program by highlighting the program on the on-screen menu and depressing the "select" button on the hand-held remote unit. This form of operation is supported by circuit 40. In response to depression of a select button or the like, processing logic 45 preferably outputs a signal over line 47 which causes the tuner to change to the frequency of the requested program. Processing logic 45 also propagates the picture parameter correction code for the selected program from memory 46 to LUT 50 over line 48. LUT 50 is preferably a 256×5 8-bit word table. The 5 8-bit words preferably provide correction values for intensity (I), clarity (CY), noise reduction (NR), black level (B), and color (CR) While these parameters are preferred, it should be recognized that the use of less than these five parameters or the inclusion or substitution of one or more other related parameters is within the scope of the present invention. As an example of the manner in which the correction values are addressed, if the code transmitted through the menu channel signal and stored in memory 46 is 00110101 this may address the location for I=55, CY=20 NR=35, B=30 and CR=90, where these numbers represent a relative magnitude that is predetermined and preprogrammed by a user/provider as discussed below.

The 8-bit correction values for each parameter are propagated over lines 60–64 to respective digital to analog converters (DACs) 70–74. The DACs convert the digital (e.g., binary) correction value to an analog voltage that is preferably fed to voltage controlled amplifiers/attenuators 80, 82–84 or another suitable attenuation device (except in the case of noise reduction correction as discussed below).

The intensity circuit 52 preferably includes a 2× gain amplifier and receives the input luminance signal propagated over line 41. The amplified luminance signal is propagated to the voltage controlled attenuator where the output of DAC 70 controls the percent of attenuation (from 0 to 100%) the amplified luminance signal is subjected to. The combination of this amplification and attenuation increases the dynamic range of the intensity component of the subject video signal.

Clarity circuit 53 also receives the luminance signal. Clarity circuit 53 preferably generates correction pulses to improve the shape of luminance transitions. The known art teaches generation of a correction pulse with a differentiation circuit. The output of the differentiator circuit is preferably filtered, for example, with an RCL filtering device 54 or the like. In a preferred embodiment, the noise reduction correction value propagated over line 61 is connected to an analog signal and used to select a variable resistance in the filter or noise reduction circuit 55. The filter preferably modifies the width of the correction pulse by removing harmonics, etc. The clarity correction value propagated on line 62 controls variable gain amplifier/attentuator 82. Attenuator 82 preferably provides amplitude adjustment of the filtered correction pulse.

The black level correction value propagated over line 63 controls the output of attenuator 83. Black level circuit 56 is essentially a DC voltage source that generates a reference voltage which can be added or subtracted from the background black level to make a picture appear lighter or darker. Attenuator 83 permits provider selection of the amount of the output of circuit 73 that is added to the luminance signal.

The outputs of attenuators 80, 82–83 are added together to create the improved or otherwise affected luminance signal which is output at port 91.

With respect to the chrominance signal which is input over line 42, color circuit 57 preferably provides a 1.5× gain of this signal, thereby increasing the dynamic range thereof. The color correction value propagated over line 64 controls the output of attenuator 84 in the same manner as discussed above for the other attenuators and hence controls the amount of the original chrominance signal that is output to port 92.

Figure 3:
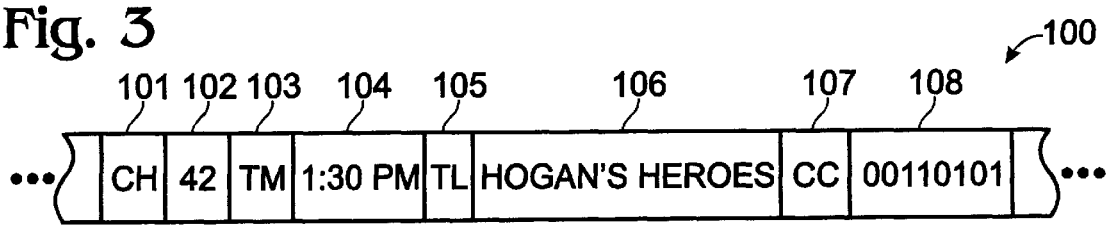
FIG. 3 is a representation of a serial stream of menu channel data in accordance with the present invention.

Referring to FIG. 3, a representation of a serial stream 100 of menu channel data in accordance with the present invention is shown. Starting at an arbitrary point in the stream, a channel indicator or code 101 is provided along with a channel number 102, for example, 42. This is followed by a time indicator 103 and the time in ASCII characters 104 that a program starts, for example, 1:30 pm. This is followed by a title indicator 105 and the accompanying title in ASCII characters 106, for example, "Hogan's Heroes." This is followed by a correction code indictor 107 and the accompanying code 108, for example, 00110101. These four blocks of information for channel 42 may be followed by additional information for channel 42 or information for another channel. As an alternative to providing an indicator or heading for each datum, it is also contemplated to provide an ordered field arrangement so that the information can be stripped out of sequential fields, eliminating the space utilized by the indicators/headers.

The channel time and program information is currently stripped off and stored in memory 46 with known processing technology. Correction code data is preferably stripped off and stored in a similar manner.

With respect to initial selection of the codes for the correction value combinations, the most common combinations (developed from empirical data) and other desired combinations, such as pass through and test patterns are determined and coded. These codes are then provided to the colorist. In one preferred embodiment, the colorist views a program and using individual controls (for example through a graphic user interface in encoding equipment 12) determines what the desired parameter correction values are for each picture parameter. The colorist then invokes a best-fit software algorithm of a type known in the art to find which of the precoded combinations most closely matches that which he or she determined with individual controls. That code is saved and placed in the appropriate memory location for subsequent insertion into the appropriate field (e.g., field 108 of FIG. 3) of the menu channel data stream.

As an alternative to individual selection of parameter correction values, a number of predetermined correction value combinations or "categories" may be defined and selected from. These preferably include the following and the like: indoors sports, outdoor sports—night, outdoor sports—day, drama, music video, western, black & white, action, nature, documentary, live news, talk-show, variety show, special event, cartoon, etc.

Though the above description described the substantially parallel transmission of programs and correction codes, and the automatic incorporation of the correction codes, logic 45 may be configured to also write the codes to a portion of memory 46 that a user can select from and scroll through using remote control unit 24. In this manner, preferred picture parameter correction values can be selected by a user.

While the above teaching is directed towards a satelite broadcast system, it should be recognized that the above teachings can be applied to other media such as VCR, DVD, laser dick, etc. For example, the correction code can be placed in the control track or supplemental audio program (SAP) or the like and streamed out with the control or SAP information.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A video signal receiving apparatus, comprising:
   a first receive channel that is capable of receiving a video signal at a first frequency;
   a second receive channel that is capable of receiving a picture parameter correction code at a second frequency that is different from said first frequency, said picture parameter correction code corresponding to a video signal received at said first receive channel; and
   a processing circuit coupled to said first receive channel and said second receive channel that processes a video signal received at said first channel based on the corresponding picture parameter correction code received at said second channel to modify the picture quality of the video signal received at said first channel.

2. The apparatus of claim 1, wherein said processing circuit is capable of extracting from said second channel data related to one or more of channel, broadcast time, and title for a video program received at said first receive channel.

3. The apparatus of claim 1, wherein said picture parameter correction code includes modification values for at least one of the group of picture parameters including intensity, color, clarity, black level and noise reduction.

4. The apparatus of claim 1, wherein said processing circuit includes a table of modification values for at least one picture parameter and said code is utilized at least in part to address said table.

5. The apparatus of claim 3, wherein said picture parameter correction code includes modification values for at least two of the group of picture parameters including intensity, color, clarity, black level and noise reduction.

6. The apparatus of claim 1, wherein said processing circuit includes a circuit for increasing the magnitude of at least one of the luminance and chrominance signals of a video signal received at said first channel.

7. The apparatus of claim 1, wherein said processing logic is provided in a satellite receiver set top box.

8. The apparatus of claim 1, wherein said second receive channel is configured to receive menu channel data.

9. The apparatus of claim 1, wherein said second receive channel is configured to receive menu channel data and said processing circuit is configured to extract said picture parameter correction code from the received menu channel data.

10. A satellite propagated video signal receiving apparatus, comprising:
    a first channel that receives a video signal at a first frequency;
    a second channel that receives picture parameter modification information, at a second frequency that is different from said first frequency, for a video signal received at said first channel; and
    a processing circuit that processes a video signal at said first channel based on picture parameter modification information received at said second channel to modify at least one of a group of specific picture parameters including intensity, color, clarity, black level and noise reduction, of a video signal received at said first channel.

11. The apparatus of claim 10, wherein said first and second video signal receiving channels each include components for receiving a satellite broadcast video signal.

12. A satellite propagated video signal receiving apparatus, comprising:
    a first mechanism that receives a video signal;
    a second mechanism that receives picture correction information for a video signal received at said first mechanism; and
    a processing circuit that processes a video signal from said first receiving mechanism based on picture correction information from said second receiving mechanism;
    wherein said picture correction information receiving mechanism is configured to receive menu channel data and said processing circuit is configured to extract picture correction information from menu channel data.

13. A method of broadcasting a video signal, comprising the steps of:
    broadcasting at a first frequency a video signal comprising video signal programming; and
    broadcasting at a second frequency a picture parameter correction code that corresponds to the video signal broadcast at said first frequency and encodes picture parameter correction information for modifying picture quality parameters of the video signal broadcast at the first frequency.

14. The method of claim 13, wherein said video signal programming and said picture parameter correction code broadcasting steps include the step of broadcasting the video signal programming and the picture parameter correction code therefor in parallel.

15. The method of claim 13, wherein said picture parameter correction code broadcasting step includes the step of broadcasting said code in a configuration that permits it to modify at least one of the group of picture quality parameters including intensity, color, clarity, black level and noise reduction.

16. The method of claim 15, wherein said picture parameter correction code broadcasting step includes the step of broadcasting said code in a configuration that permits it to modify at least two of the group of picture quality parameters including intensity, color, clarity, black level and noise reduction.

17. The method of claim 13, wherein said picture parameter correction code broadcasting step includes the step of broadcasting said picture parameter correction code via satellite transmission.

18. A video signal receiving apparatus, comprising:
    a first receive channel that is capable of receiving a video signal at a first frequency;

a second receive channel that is capable of receiving picture correction information at a second frequency that is different from said first frequency, said picture correction information being for a video signal received at said first receive channel; and a processing circuit coupled to said first receive channel and said second receive channel that processes a video signal received at said first channel based on picture correction information received at said second channel; and wherein said picture correction information is propagated to said second channel as a code and said processing circuit includes logic that decodes said code, said decoding logic including a table of correction values for at least one picture parameter and said code being utilized at least in part to address said table.

19. A video signal receiving apparatus, comprising:

a first receive channel that is capable of receiving a video signal at a first frequency;

a second receive channel that is capable of receiving picture correction information at a second frequency that is different from said first frequency, said picture correction information being for a video signal received at said first receive channel; and a processing circuit coupled to said first receive channel and said second receive channel that processes a video signal received at said first channel based on picture correction information received at said second channel; and wherein said processing circuit includes a circuit for increasing the magnitude of at least one of the luminance and chrominance signals of a video signal received at said first channel based on said received picture correction information.

20. A video signal receiving apparatus, comprising:

a first receive channel that is capable of receiving a video signal at a first frequency;

a second receive channel that is capable of receiving picture correction information at a second frequency that is different from said first frequency, said picture correction information being for a video signal received at said first receive channel; and a processing circuit coupled to said first receive channel and said second receive channel that processes a video signal received at said first channel based on picture correction information received at said second channel; and wherein said second receive channel is configured to receive menu channel data and said picture correction information is extracted from amongst said menu channel data.

* * * * *